(12) United States Patent
Yamamoto et al.

(10) Patent No.: US 7,849,899 B2
(45) Date of Patent: Dec. 14, 2010

(54) ADHESIVE FILM POSITION DETECTOR AND ADHESIVE FILM JOINING APPARATUS

(75) Inventors: Masayuki Yamamoto, Ibaraki (JP); Satoshi Ikeda, Kameyama (JP)

(73) Assignee: Nitto Denko Corporation, Osaka (JP)

( * ) Notice: Subject to any disclaimer, the term of this patent is extended or adjusted under 35 U.S.C. 154(b) by 130 days.

(21) Appl. No.: 12/392,372

(22) Filed: Feb. 25, 2009

(65) Prior Publication Data

US 2009/0218046 A1    Sep. 3, 2009

(30) Foreign Application Priority Data

Feb. 29, 2008    (JP) .............................. 2008-050481

(51) Int. Cl.
B32B 41/00    (2006.01)
(52) U.S. Cl. .................. 156/379; 156/350; 156/504
(58) Field of Classification Search .................. 156/350, 156/379, 504
See application file for complete search history.

(56) References Cited

U.S. PATENT DOCUMENTS

2006/0021710 A1* 2/2006 Nitta .......................... 156/538
2006/0027331 A1* 2/2006 Hirai et al. .................. 156/541

FOREIGN PATENT DOCUMENTS

JP    07-195527 A    8/1995

* cited by examiner

*Primary Examiner*—Khanh Nguyen
*Assistant Examiner*—Vishal I Patel
(74) *Attorney, Agent, or Firm*—Cheng Law Group, PLLC (57) ABSTRACT

An illuminator emits light obliquely to an end of an adhesive film. A CCD camera is provided in a direction perpendicular to the adhesive film to capture an image of the light reflected irregularly from the end of the adhesive film. A black plate is provided on a back side of the adhesive film. In the image obtained by the CCD camera, therefore, only the end of the adhesive film is displayed whitely in a line shape. A position of the adhesive film is determined based on a line corresponding to the end of the adhesive film. Since the light reflected from the end of the adhesive film is utilized, the position of the adhesive film can be determined accurately irrespective of a color of the adhesive film, a color of a base film to which the adhesive film is joined, and a depth of each color.

10 Claims, 9 Drawing Sheets

ADHESIVE FILM POSITION DETECTOR AND ADHESIVE FILM JOINING APPARATUS

BACKGROUND OF THE INVENTION (1) Field of the Invention

The present invention relates to an adhesive film position detector and an adhesive film joining apparatus. Specifically, in one step of surface treatment for various substrates such as a semiconductor substrate and a glass substrate for use in a liquid crystal display device, the adhesive film position detector is used when an adhesive film is joined to a surface of a substrate. Herein, the adhesive film has a shape corresponding to a shape of the substrate.

(2) Description of the Related Art

Conventionally, there have been proposed various adhesive film joining apparatuses for joining, to a surface of a substrate, an adhesive film having a shape corresponding to a shape of the substrate. For example, JP 07-195527 A discloses an adhesive film joining apparatus having the following configuration. That is, a colored adhesive film joined to a transparent base tape is fed by film feed means, and then is detected by a film detection mechanism when arriving at a certain position. Based on a result of the detection, the film detection mechanism stops the feed of the base tape. Alternatively, the film detection mechanism detects deviations in the relative position and angle between the adhesive film and a substrate at the stop position. Thereafter, these deviations are corrected, so that the substrate and the base tape are fed in synchronization with each other. Thus, an adhesive film, which is separated from the base tape at a tape folding end, is joined to a surface of a substrate in succession.

In the adhesive film joining apparatus disclosed in JP 07-195527 A, the film detection mechanism includes a first reflective optical sensor for detecting an adhesive film while the film supply tape is fed. The film detection mechanism also includes a second reflective optical sensor in accordance with a size of the adhesive film to be used herein. At the time when a rear end edge of the adhesive film is detected by the second optical sensor, the feed of the film supply tape is stopped. Herein, this stop position is defined as a predetermined joining position.

The film detection mechanism also includes a CCD camera serving as detection means for detecting a positional deviation of the adhesive film. When the feed of the film supply tape is stopped, the CCD camera captures an image of the colored adhesive film. Then, the film detection mechanism detects the positional deviation by measuring a distance from a predetermined reference line to an end surface of the adhesive film.

However, the technique disclosed in JP 07-195527 A still has the following problem which can not be solved thereby.

In a case where an adhesive film is an optically transparent or semitransparent film, it is very difficult for the adhesive film joining apparatus disclosed in JP 07-195527 A to stably detect such an adhesive film through use of the optical sensor such as the reflective optical sensor. Since the base tape is of a transparent type, if the adhesive film joined to the base tape is of a transparent or semitransparent type, the optical sensor fails to recognize a difference between an amount of light reflected from the base tape and an amount of light reflected from the adhesive film. Consequently, there arises a problem that an adhesive film can not be stably set at the joining position.

In the technique disclosed in JP 07-195527 A, a positional deviation is detected through use of the CCD camera. However, in a case where an adhesive film to be used herein is of a transparent type or a slightly colored type, it is difficult to detect an end surface of such an adhesive film even with this detecting method. The CCD camera fails to clearly recognize a contrast between the transparent base tape and the transparent or slightly colored adhesive film. Consequently, the film detection mechanism fails to detect an end surface of the adhesive film. As a result, the film detection mechanism fails to measure a distance from the reference line to the end surface of the adhesive film. Moreover, the film detection mechanism fails to accurately detect a position of the adhesive film.

SUMMARY OF THE INVENTION

An object of the present invention is to provide an adhesive film position detector and an adhesive film joining apparatus each used for joining an adhesive film to a substrate with good accuracy, irrespective of a color of an adhesive film, a color of a base film, a type or a depth of each color, and transparency of the adhesive film and the base film.

In order to accomplish the object described above, the present invention adopts the following configuration.

An adhesive film position detector including:

illumination means for emitting light obliquely to an end of an adhesive film formed into a predetermined shape and joined to a base film in a longitudinal direction at regular intervals;

a black plate provided on an undersurface of the base film irradiated with the light from the illumination means;

light adjusting means for adjusting intensity of the light from the illumination means;

illumination angle adjusting means for adjusting an illumination angle of the light from the illumination means; and imaging means provided above the adhesive film in a direction perpendicular to the adhesive film, wherein the imaging means receives the light, which is emitted from the illumination means and then is reflected irregularly at the end of the adhesive film, to detect a position of the adhesive film.

According to the adhesive film position detector of the present invention, the illumination means emits the light obliquely to the end of the adhesive film, and the imaging means captures the image of the light reflected irregularly from the end of the adhesive film. As a result, the adhesive film position detector can detect the position of the end of the adhesive film with good accuracy.

In the adhesive film position detector, preferably, the imaging means is a CCD camera, for example. When the CCD camera captures an image of the light reflected from the end of the adhesive film, the light can be measured based on pixels of a screen of the CCD camera. Accordingly, the adhesive film position detector can accurately measure the position of the end of the adhesive film.

In the adhesive film position detector, preferably, the illumination means emits red light, blue light and green light with different peak wavelengths, for example. Specifically, the illumination means may be a three-wavelength fluorescent lamp or an aggregate of a single-wavelength LED for red light, a single-wavelength LED for blue light and a single-wavelength LED for green light. Since the illumination means emits the red light, the blue light and the green light at their peak wavelengths, the adhesive film position detector can detect the position of the end of the adhesive film irrespective of a color of the adhesive film or the base film.

Herein, the adhesive film and the base film may be of a transparent type. Moreover, the adhesive film and the base film may be of a colorless type. Even in a case where the adhesive film and the base film to be used is of a transparent or colorless type, which can not be detected with a conventional technique, the adhesive film position detector of the present invention can accurately detect a position of an end of the adhesive film.

More preferably, the plate is of a mat type, for example. Use of the black and mat plate allows more reduction in influence of light reflected from the plate when the plate is disposed on the undersurface of the base film. Accordingly, the adhesive film position detector can detect an end of an adhesive film more accurately.

In order to accomplish the object described above, the present invention also adopts the following configuration.

An adhesive film joining apparatus comprising:

the adhesive film position detector described above;

tape feed means for feeding a film supply tape configured with the base film and the adhesive film joined to the base film in the longitudinal direction at regular intervals;

film separation means for folding and guiding the film supply tape to separate the adhesive film from the base film at a folding end;

a joining roller disposed at a position near the folding end so as to move vertically;

a joining table on which the adhesive film is joined to a substrate placed thereon; and control means for stopping the feed of the film supply tape, based on an adhesive film position signal outputted from the adhesive film position detector, measuring a positional deviation of the adhesive film at the stop position, and correcting a position of the joining table.

With this configuration, the feed of the film supply tape is stopped based on the signal indicating the position of the adhesive film detected by the adhesive film position detector. Further, the positional deviation of the adhesive film is measured, and the position of the joining table is corrected based on the positional deviation.

Accordingly, the adhesive film joining apparatus can accurately join an adhesive film to a semiconductor substrate.

Herein, the adhesive film joining apparatus may be configured as follows.

For example, the adhesive film position detector detects at least a rear end of the adhesive film in an adhesive film feeding direction, and the control means corrects the position of the joining table, based on a difference between predetermined reference position information and a result of the actually measured rear end.

Alternatively, the substrate is a semiconductor substrate, the adhesive film joining apparatus further includes detection means for detecting a position of an orientation flat or a notch of the semiconductor substrate, and the control means corrects a positional deviation about a center axis of the semiconductor substrate, based on a detection result by the detection means.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

With reference to the drawings, hereinafter, description will be given of preferred embodiments of the present invention.

Herein, description will be given of, as an example, a case of joining to a semiconductor substrate an adhesive film having a shape almost equal to a shape of the semiconductor substrate.

(Adhesive Film Position Detector)

Figure 1:
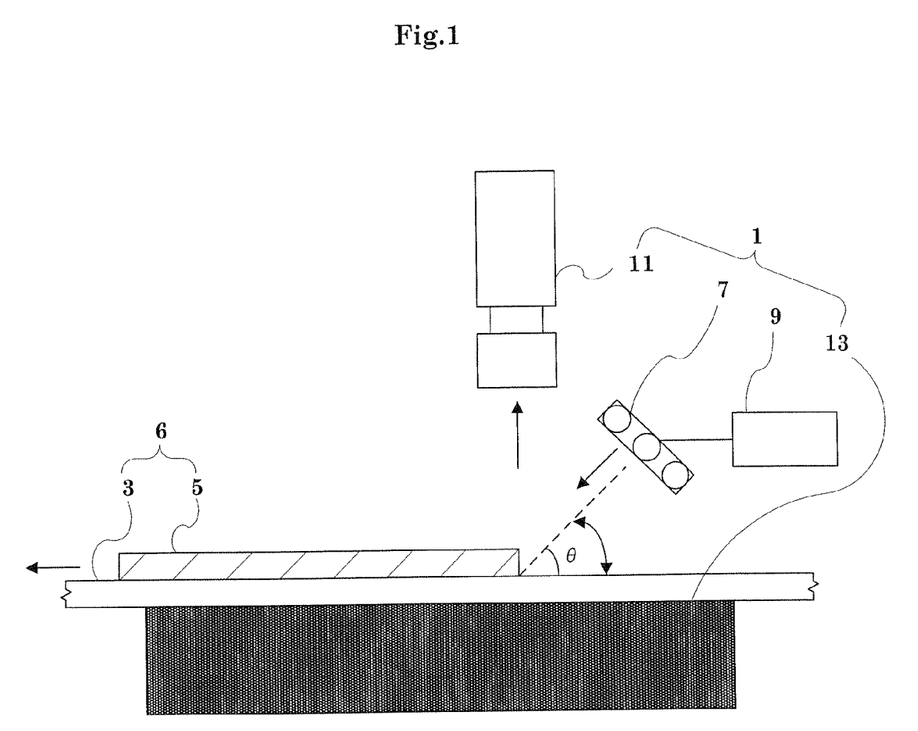
FIG. 1 is a longitudinal side view schematically showing an adhesive film position detector according to one embodiment of the present invention.

As shown in FIG. 1, an adhesive film position detector 1 includes an illuminator 7, a dimmer 9, an illumination angle adjustment mechanism 8 (see FIG. 7) and a CCD camera 11. Herein, the illuminator 7 emits light to a rear end of an adhesive film 5 joined to a base film 3 which is fed leftward in FIG. 1. The dimmer 9 adjusts chromaticity and illuminance of the light emitted from the illuminator 7. The illumination angle adjustment mechanism 8 adjusts an illumination angle of the light emitted from the illuminator 7. The CCD camera 11 captures an image of the light which is emitted from the illuminator 7, is reflected irregularly at the rear end of the adhesive film 5 and is directed upward in a direction perpendicular to the adhesive film 5. Moreover, the adhesive film position detector 1 also includes a black and mat plate 13 provided on the undersurface of the base film 3. It is to be noted that the CCD camera 11 corresponds to imaging means according to the present invention.

A film supply tape 6 has the following configuration. That is, a plurality of sheet-like adhesive films 5 are joined to the base film 3 at regular intervals. Herein, each adhesive film 5 is previously formed into a given shape in correspondence with a shape of a target to which the adhesive film 5 will be joined, for example. The film supply tape 6 is fed at a predetermined speed and then is stopped when the adhesive film position detector 1 detects the adhesive film 5 on the base film 3.

Figure 2A:
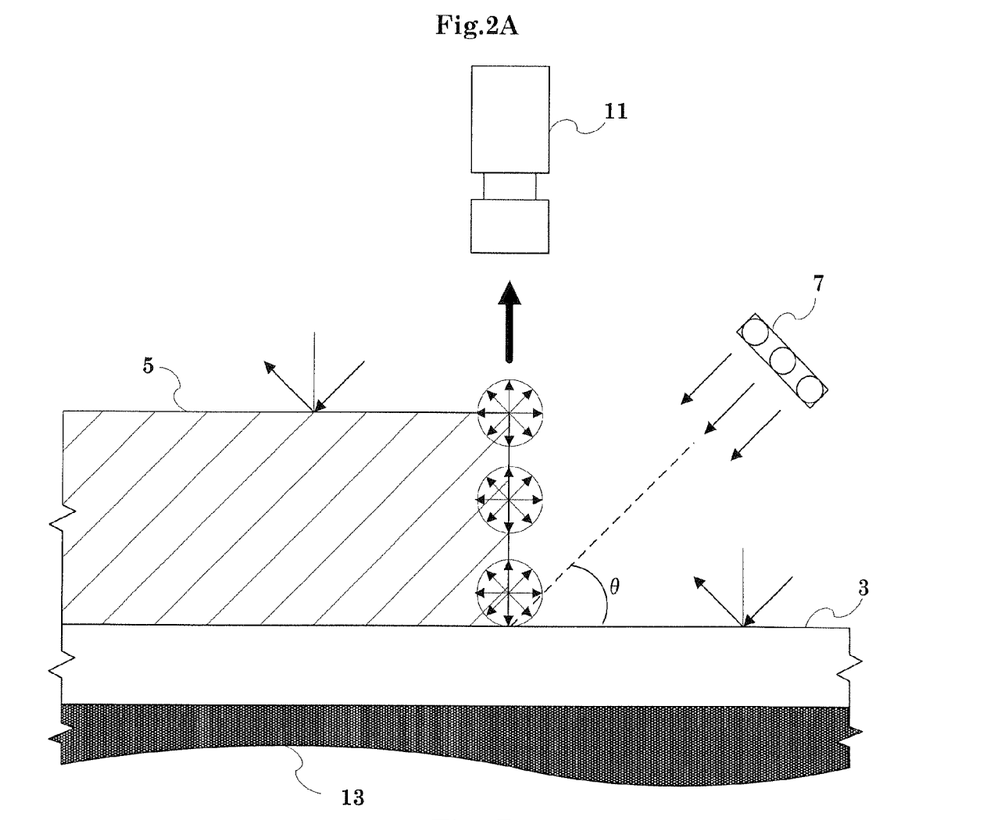
FIGS. 2A and 2B each show a process of capturing an image of light reflected irregularly at an end of an adhesive film.
Figure 2B:
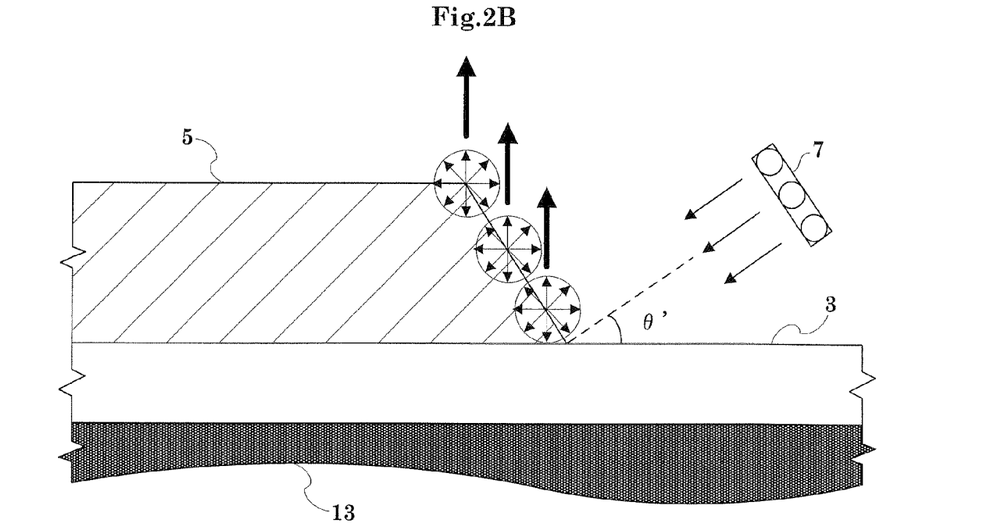

With reference to FIGS. 2A and 2B, next, detailed description will be given of a method of detecting a position of an adhesive film through use of irregular reflection of light at an end of the adhesive film.

As shown in FIG. 2A, light emitted from the illuminator 7 is reflected regularly and irregularly at any surface of the base film 3 and any surface of the adhesive film 5. In this embodiment, the CCD camera 11 is disposed at a position above the adhesive film 5 in a direction perpendicular to the adhesive film 5 so as to receive components of the light, which travel upward in a direction perpendicular to the adhesive film 5, from among the light reflected irregularly at the end surface of the adhesive film 5. Moreover, the CCD camera 11 also receives components of the light which travels downward in a direction perpendicular to the adhesive film 5 and then are reflected from the top surface of the base film 3. As described above, the CCD camera 11 receives only the components of the light, which travels along the end surface of the adhesive film 5, from among the components of the light reflected irregularly at the respective points on the end surface of the adhesive film 5, as an aggregate of the light reflected at the respective points on the end surface of the adhesive film 5.

Herein, the light reflected regularly at the surface other than the end surface of the adhesive film 5 is reflected at an angle which is equal to an incident angle of the light. Therefore, the CCD camera 11, which is provided above the adhesive film 5 in the direction perpendicular to the adhesive film 5, receives no light reflected regularly. Similarly, the CCD camera 11 receives no light reflected regularly at the top surface of the base film 3. Therefore, it is apparent from the foregoing description that light to be received by the CCD camera 11 is light reflected perpendicularly from the end surface of the adhesive film 5. Accordingly, the CCD camera 11 can accurately capture an image of a position of the end surface of the adhesive film 5.

Moreover, the light reflected irregularly at the respective points on the surfaces of the adhesive film 5 and the respective points on the surfaces of the base film 3 is almost equal in amount to one another. Therefore, the CCD camera 11 receives the light evenly at entire pixels. Thus, the end surface of the adhesive film 5 can be accurately detected based on a contrast between an amount of the light reflected from the base film 3 and an amount of the light reflected irregularly at the end surface of the adhesive film 5 and then received by the CCD camera 11.

In order to make the contrast clear, the black plate 13 is provided on the undersurface of the base film 3. Thus, the black plate 13 absorbs the light passing through the base film 3, leading to suppression of an influence of the light reflected from the plate 13. Herein, use of the black and mat plate 13 allows further suppression of the reflection of the light.

Figure 3A:
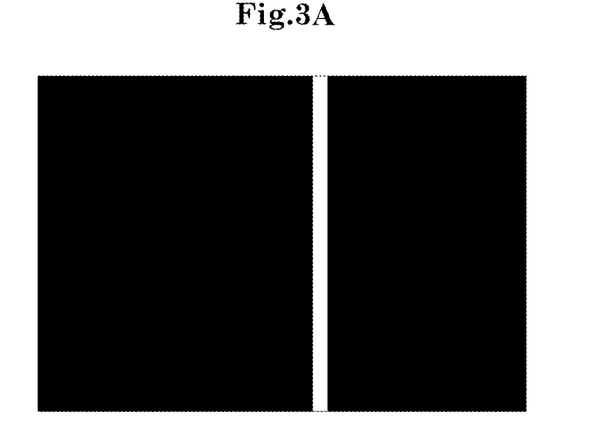
FIGS. 3A to 3C each show an image obtained through use of the adhesive film position detector.

FIG. 3A shows an image obtained through use of the configuration described above. As shown in FIG. 3A, a white line corresponding to the end of the adhesive film 5 is displayed clearly in the black image. In other words, the method described above allows detection of an end of an adhesive film in such a manner that only a white line corresponding to the end of the adhesive film is displayed clearly in a black image. In order to obtain such an image, the CCD camera 11 has a field of view set within a range between 5 mm square or more and 10 mm square or less. Moreover, the CCD camera 11 has a resolution set within a range between 10 μm or more and 20 μm or less. Further, a distance from the CCD camera 11 to the adhesive film 5 is set within a range between 30 mm or more and 50 mm or less. In addition, the CCD camera 11 has a magnification of about 100 times such that a white line corresponding to the light reflected irregularly from the end of the adhesive film 5 has a width of 100 μm or less.

Figure 3B:
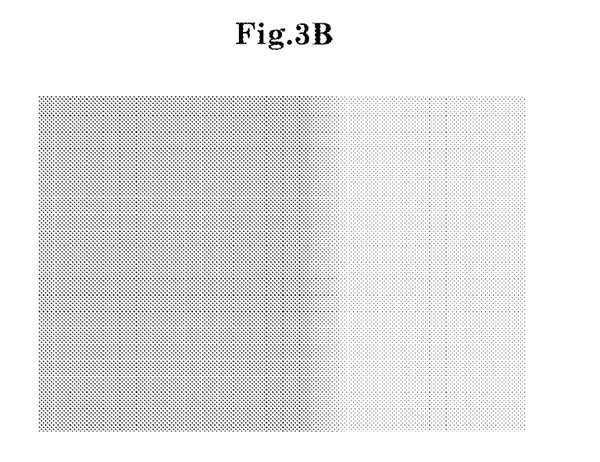

FIG. 3B shows an image obtained in a case where the plate 13 to be used herein is of a white type. In this case, the CCD camera 11 receives the light reflected from the entire surfaces of the adhesive film 5, the base film 3 and the plate 13. Therefore, the resultant image is displayed whitely. Moreover, a contrast at the end of the adhesive film 5 is unclear. Consequently, the image film position detector 1 fails to detect the position of the end of the adhesive film 5. For this reason, it is desirable that the plate 13 to be used herein is of a black type.

Figure 3C:
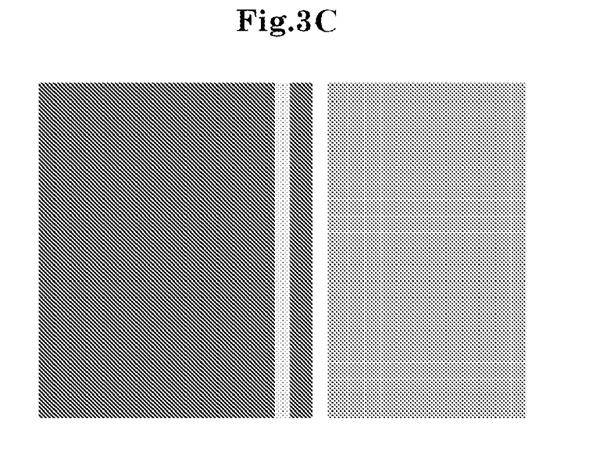

FIG. 3C shows an image obtained in a case where the adhesive film 5 to be used herein has a tapered end surface as shown in FIG. 2B or in a case where the adhesive film 5 to be used herein has a large thickness. Also in this case, a contrast at the end of the adhesive film 5 is unclear. Consequently, the image film position detector 1 fails to detect the position of the end of the adhesive film 5.

In order to obtain the image shown in FIG. 3A, the dimmer 9 adjusts the intensity of the light emitted from the illuminator 7 and the illumination angle adjustment mechanism 8 adjusts the illumination angle of the light emitted from the illuminator 7. It is desirable herein that the illumination angle adjustment mechanism 8 adjusts an angle of the illuminator 7 within a range between 10° or more and 45° or less with respect to the plate 13. Thus, the illumination angle adjustment mechanism 8 can adjust the angle of the light emitted from the illuminator 7, in accordance with the thickness of the adhesive film 5 and the shape of the end of the adhesive film 5. Further, the CCD camera 11 can capture an optimal image in order to detect the position of the end of the adhesive film 5.

Herein, the white light reflected from the end of the adhesive film 5 has a brightness set within a range between 50 cd or more and 100 cd or less. Moreover, a contrast between the black portion and the white portion in the image is set at a ratio of 1:100 or more. The amount and the incident angle of the light are adjusted in order to obtain an image having the features described above.

Moreover, the illuminator 7 emits red light, green light and blue light (RGB) with different peak wavelengths. Examples of the illuminator 7 may include an illuminator which is an aggregate of a single-wavelength LED for red light, a single-wavelength LED for green light and a single-wavelength LED for blue light, a three-wavelength fluorescent lump, and the like. Herein, the dimmer 9 can adjust intensities of the red light, the green light and the blue light each emitted from the illuminator 7. Therefore, the dimmer 9 can adjust the intensity of the light to be emitted to the adhesive film 5. Further, the dimmer 9 can adjust the intensity of the light for each wavelength of RGB. Thus, even when each of the adhesive film 5 and the base film 3 is of a colored type, the dimmer 9 adjusts the intensity of the light emitted from the illuminator 7 for each color, thereby adjusting a contrast of an image to be captured by the CCD camera 11.

That is, the illuminator 7 strongly emits light having chromaticity different from the color of the adhesive film 5 and the color of the base film 3, so that the respective films absorb the light. This configuration prevents reduction in contrast.

(Adhesive Film Joining Apparatus)

Figure 4:
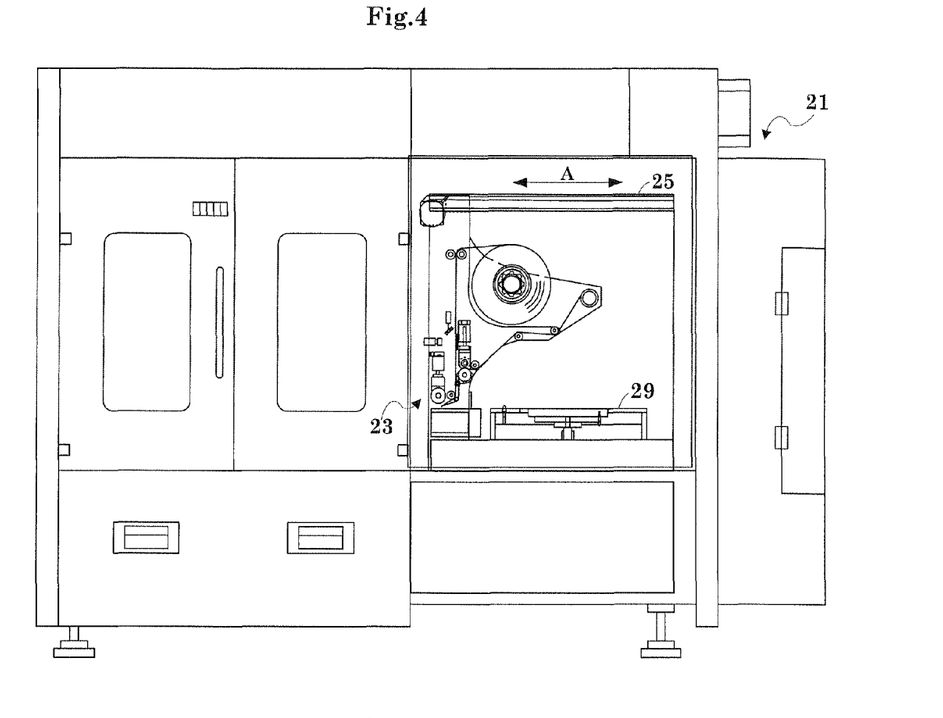
FIG. 4 is a front view schematically showing an adhesive film joining apparatus.
Figure 5:
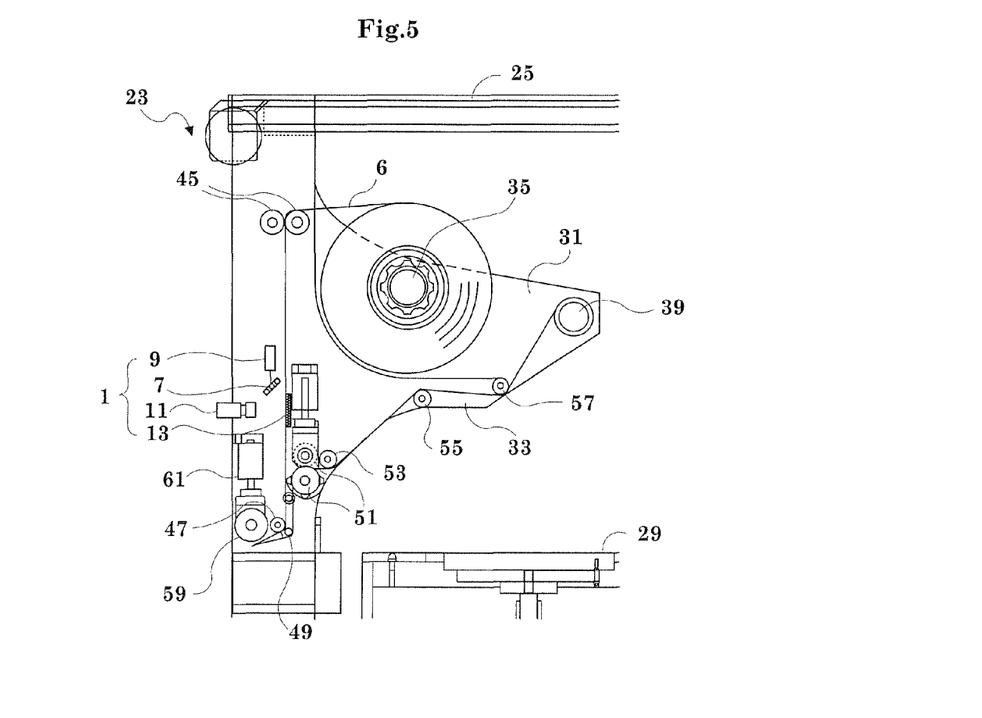
FIG. 5 is a front view schematically showing an adhesive film joining unit.

With reference to FIGS. 4 and 5, next, detailed description will be given of an adhesive film joining apparatus 21 including the adhesive film position detector 1 described above.

The adhesive film joining apparatus 21 also includes a joining unit 23. The joining unit 23 is installed vertically on a rail 25 provided inside the adhesive film joining apparatus 21. Herein, the joining unit 23 can reciprocate in a direction shown by an arrow mark A in FIG. 4 through a drive device (not shown). Moreover, the joining unit 23 has a drive mechanism (not shown). The drive mechanism allows vertical movement and alignment of a joining table 29 on which a semiconductor substrate 27 (see FIG. 6) is placed. In addition, the drive mechanism allows movement of various workpieces provided in the adhesive film joining apparatus 21. Herein, a configuration of the drive mechanism is well-known; therefore, detailed description thereof will not be given.

As shown in FIG. 5, the joining unit 23 also includes a pair of main frames 31 each installed vertically on the rail 25. Herein, FIG. 5 does not show the main frame 31 provided forward when being viewed from a front side, but shows only the main frame 31 provided rearward. Moreover, a pair of side frames 33 are provided between the pair of main frames 31.

Herein, FIG. 5 shows only the side frame 33 provided rearward when being viewed from the front side. A reel shaft 35 is rotatably supported between the pair of main frames 31, and the film supply tape 6 is wound around the reel shaft 35 in a roll form. As will be described later, a reeling shaft 39 is also supported between the pair of main frames 31, and reels the base film 3 from which the adhesive film 5 is separated.

Moreover, a pair of unreeling rollers 45, a guide roller 47, a guide roller 49, a pair of pulling rollers 51, and three guide rollers 53, 55 and 57 are rotatably provided between the pair of side frames 33 in this order from an upstream side of the film supply tape 6 along a feeding direction of the film supply tape 6. Herein, one of the unreeling rollers 45 is driven by a motor (not shown). By rotation of the unreeling roller 45, thus, the film supply tape 6 is unreeled from the reel shaft 35. It is to be noted that the unreeling roller 45 corresponds to tape feed means according to the present invention.

Figure 6:
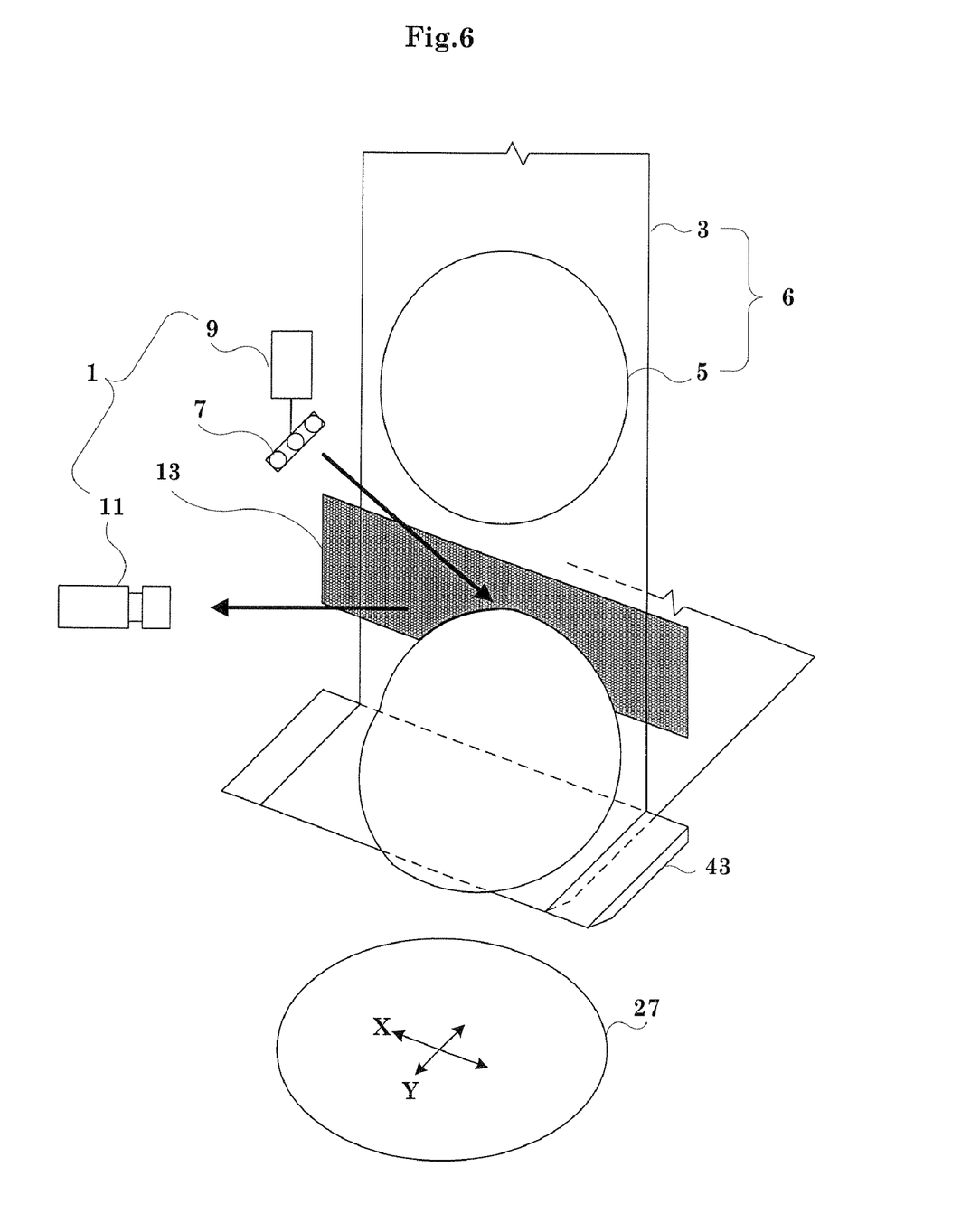
FIG. 6 is a perspective view schematically showing an adhesive film folding part.

With reference to FIG. 6, next, description will be given of the configuration of the film supply tape 6. FIG. 6 schematically shows the film supply tape 6 in an enlarged manner.

The film supply tape 6 is configured with the colorless and transparent base film 3 which is formed into a continuous strip shape, and the colorless and transparent adhesive films 5 which are joined to the base film 3 in a longitudinal direction of the base film 3 at regular intervals.

By the rotation of the unreeling roller 45, the film supply tape 6 is unreeled from the reel shaft 35. When the adhesive film position detector 1 disposed above the guide roller 47 detects a rear end of an adhesive film 5 on the base film 3, the motor for the unreeling roller 45 is stopped, so that the feed of the film supply tape 6 is stopped. In order to detect the rear end of the adhesive film 5, the illuminator 7 is disposed at an upstream side of the film supply tape 6 to emit light to the film supply tape 6. The light emitted from the illuminator 7 is reflected irregularly at the rear end of the adhesive film 5. In order to capture an image of the reflected light, the CCD camera 11 is disposed in a direction perpendicular to the adhesive film 5. Moreover, the black and mat plate 13 is disposed on the back side of the base film 3 so as to oppose the CCD camera 11.

In this embodiment, the adhesive film position detector 1 also detects a longitudinal positional deviation in order to perform longitudinal alignment of the adhesive film 5 joined to the base film 3.

More specifically, the adhesive film position detector 1 stops the feed of the film supply tape 6 and then detects the positional deviation ΔY of the adhesive film 5 in the longitudinal direction (the Y direction) of the base film 3. This positional deviation is corrected in such a manner that a position of the joining table 29 is corrected. Moreover, at the time when the adhesive film 5 is joined to the base film 3, each of the base film 3 and the adhesive film 5 is previously subjected to alignment in an X direction. Accordingly, there occurs no positional deviation ΔX in the width direction (the X direction) because the position of the base film 3 is set with respect to the semiconductor substrate 27 in the X direction by another method for alignment.

Thereafter, the film supply tape 6 is folded back at a tip end of a guide member 43, which is formed into a knife edge shape, and is fed toward the reeling shaft 39. Herein, when the film supply tape 6 is folded back at the tip end of the guide member 43, the adhesive film 5 is separated from the base film 3. It is to be noted that the guide member 43 corresponds to film separation means according to the present invention.

Figure 7:
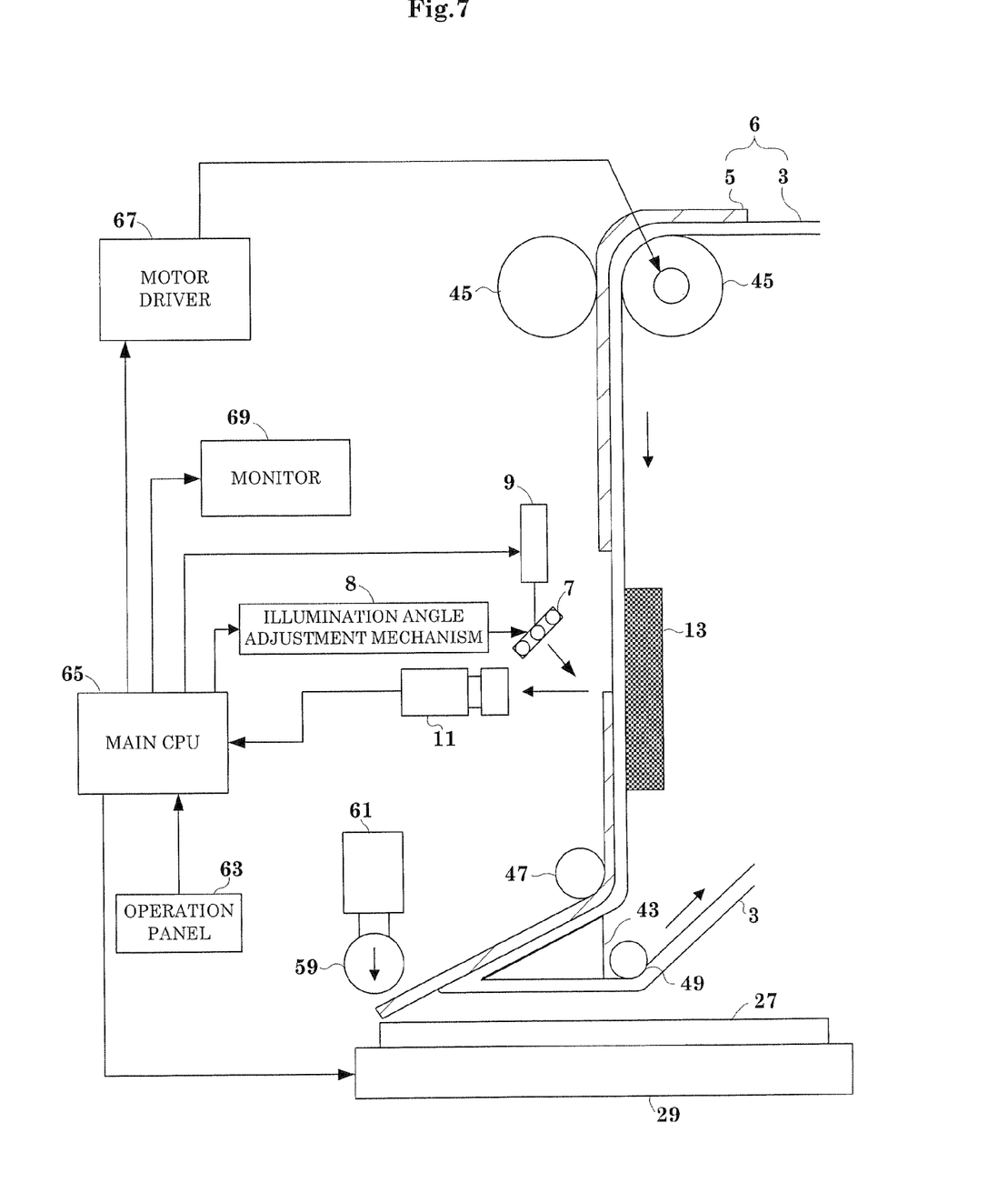
FIG. 7 is a block diagram showing a drive system for the adhesive film joining apparatus.
Figure 8:
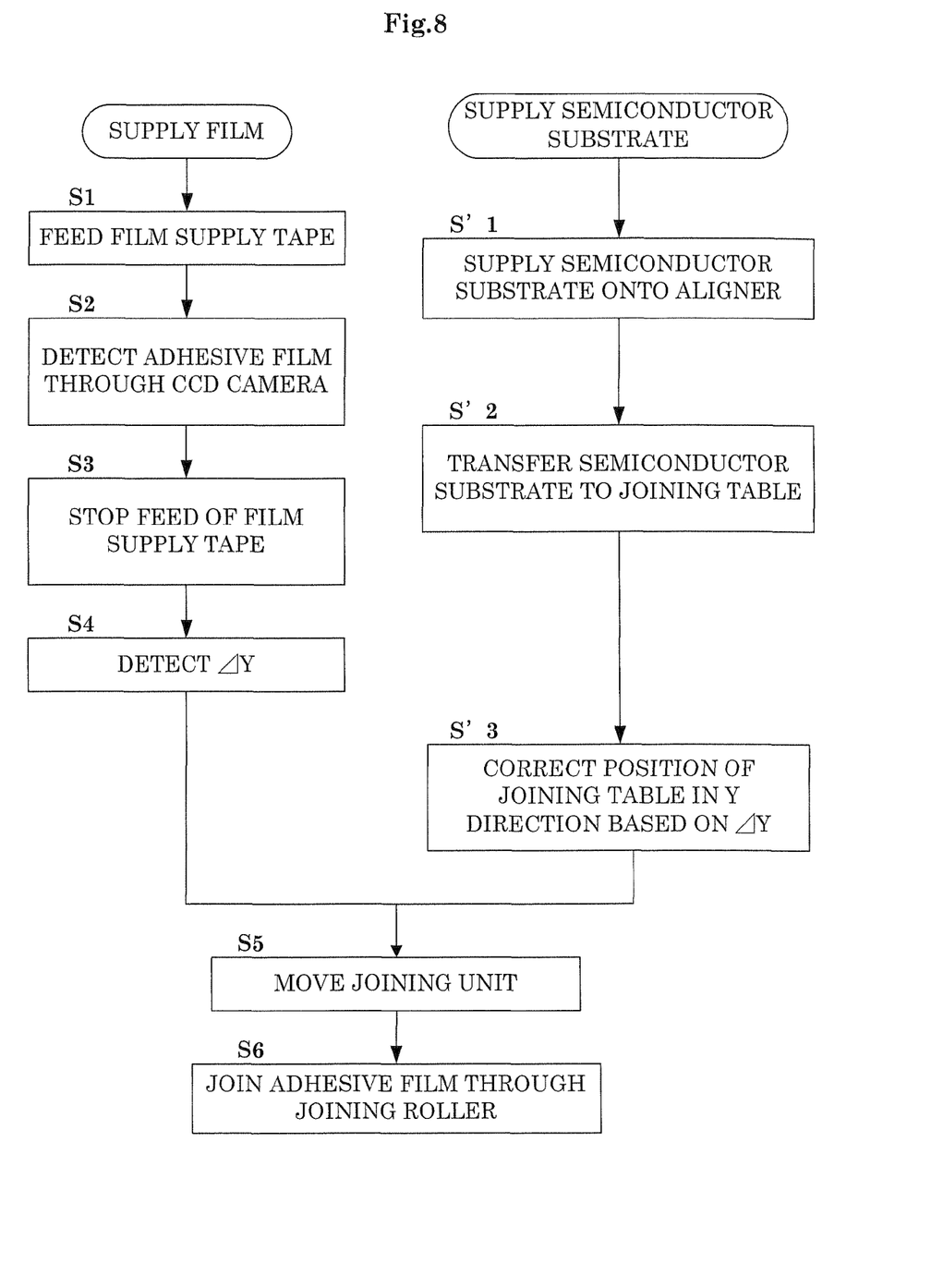
FIG. 8 is a flowchart showing operations of the adhesive film joining apparatus according to the embodiment.

As shown in FIG. 7, moreover, a joining roller 59 is disposed at a position near the tip end of the guide member 43 so as to move vertically. In the process of joining the adhesive film 5 to the semiconductor substrate 27, the joining unit 23 moves along the rail 25 toward the joining table 29, so that the adhesive film 5 separated from the base film 3 is set at a joining start position on the semiconductor substrate 27 placed on the joining table 29. Then, the joining roller 59 moves downward by means of an air cylinder 61 to press a separated end of the adhesive film 5. Thus, the adhesive film 5 is joined to a surface of the semiconductor substrate 27 as the joining unit 23 moves.

When the adhesive film 5 is separated from the base film 3 through the guide member 43, the base film 3 is pulled by the pair of pulling rollers 51 (the lower pulling roller 51 is driven so as to rotate) and then is reeled by the reeling shaft 39 while being guided by the guide rollers 53, 55 and 57. Herein, the reeling shaft 39 is driven so as to rotate in synchronization with the unreeling roller 45 and the pulling roller 51.

(Method of Detecting Adhesive Film)

With reference to FIGS. 7, 8 and 9A to 9E, next, description will be given of a drive system for the adhesive film joining apparatus 21 configured as described above, and an adhesive film detecting method.

((Step 1))

Figure 9A:
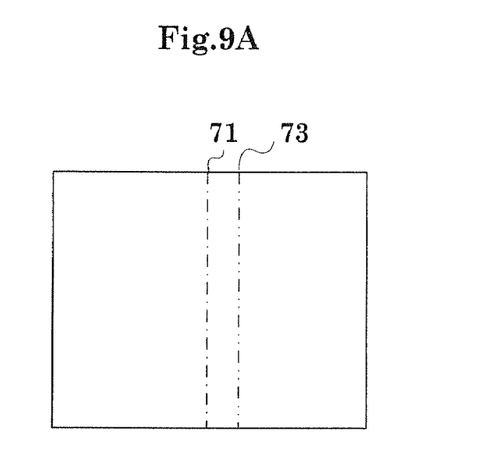
FIGS. 9A to 9E each show an image of light reflected from a film supply tape.

As shown in FIG. 7, when a user inputs through an operation panel 63 a command to start joining of an adhesive film 5 to a semiconductor substrate 27, a main CPU 65 receives a joining start signal. Then, the main CPU 65 transmits an operation signal to a motor driver 67. When the motor driver 67 is actuated, the unreeling roller 45 rotates to feed the film supply tape 6. Herein, an adhesive film 5 joined to the base film 3 is fed toward the guide member 43. An image captured by the CCD camera 11 is displayed on a monitor 69 through the main CPU 65. Herein, light which is reflected irregularly at a front end of the adhesive film 5 is smaller than light which is reflected irregularly at a rear end of the adhesive film 5 and, therefore, does not satisfy preset conditions such as a brightness and a contrast. That is, the light which is emitted to the front end is reflected regularly at the surface of the adhesive film 5. Further, the light partly passes through the adhesive film 5 and then is attenuated. Accordingly, the light reflected from the front end is smaller in amount than the light reflected from the rear end and, therefore, is not detected in a calculating process by the main CPU 65. As shown in FIG. 9A, the image displayed on the monitor 69 is entirely black at the time when the film supply tape 6 is fed. FIGS. 9A to 9E each show an image to be displayed on the monitor 69. Herein, an alternate long and short dashed line represents a reference line 71 of an adhesive film 5, and a chain double-dashed line represents a motor driver stop line 73.

Figure 9B:
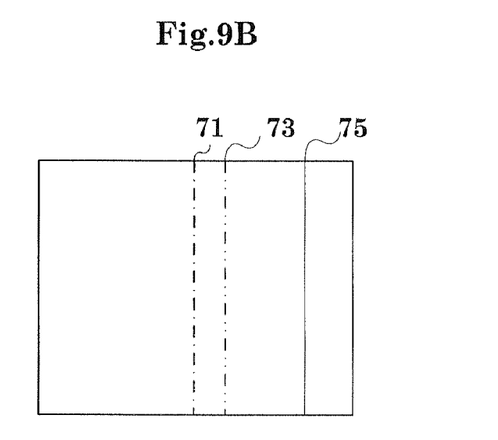

As shown in FIG. 9B, when the film supply tape 6 is fed toward the guide member 47 and the rear end of the adhesive film 5 reaches within the field of view of the CCD camera 11, a line 75 showing the light reflected from the rear end of the adhesive film 5 is displayed on the monitor 69.

((Step 2))

Figure 9C:
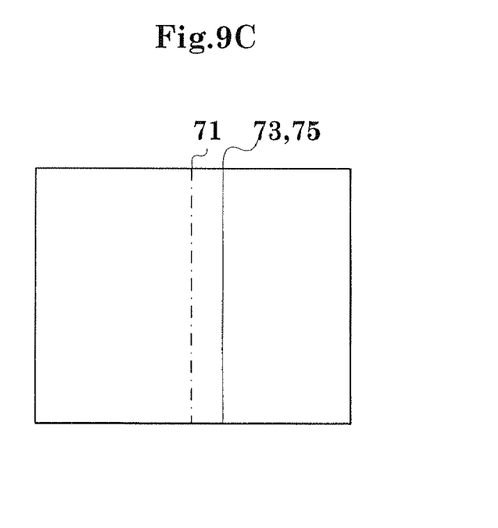

As shown in FIG. 9C, next, the main CPU 65 detects a fact that the reflected light line 75 passes on the motor driver stop line 73. Next, the main CPU 65 transmits to the motor driver 67 a signal for stopping the motor for the unreeling roller 45.

((Step 3))

Figure 9D:
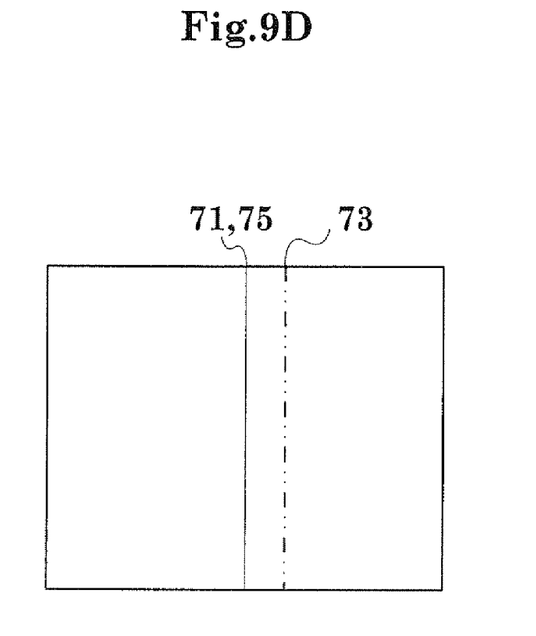

When the motor of the motor driver 67 stops, the unreeling roller 45 also stops. In synchronization with this stop, each of the pulling roller 51 and the reeling shaft 39 stops, so that the feed of the film supply tape 6 is stopped. The film supply tape 6 is fed to a certain degree during a period from the transmission of the signal from the main CPU 65 to the actual stop of the feed of the film supply tape 6. Therefore, the motor driver stop line 73 is set previously such that the light reflected from the rear end of the stopped adhesive film 5 is on the reference line 71. As shown in FIG. 9D, next, the line 75 showing the light reflected from the rear end of the adhesive film 5 is displayed on the monitor 69 while being superimposed on the reference line 71.

Herein, the rear end of the adhesive film 5 lies within the field of view of the CCD camera 11. The front end of the adhesive film 5 is separated from the base film 3. As shown in FIG. 6, thus, the front end of the adhesive film 5 protrudes from the guide member 43 only by a predetermined length.

((Step 4))

Figure 9E:
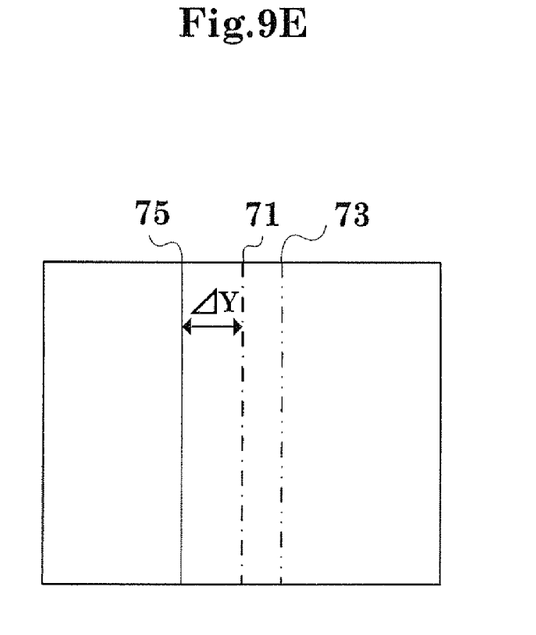

As shown in FIG. 9E, after the stop of the film supply tape 6, if the line 75 showing the light reflected from the rear end of the adhesive film 5 is displayed on the monitor 69 while deviating from the reference line 71, the main CPU 65 counts up the number of pixels of the monitor 69 in an area between the line 75 and the reference line 71 to calculate a positional deviation ΔY.

((Step S'2))

When the film supply tape 6 is fed, a semiconductor substrate 27 is pulled out from a cassette board (not shown) and then is supplied onto an aligner (not shown). The aligner performs alignment of the semiconductor substrate 27 placed thereon.

((Step S'2))

After the alignment, the semiconductor substrate 27 is transferred onto the joining table 29.

((Step S'3))

Based on data about the positional deviation ΔY of the adhesive film 5 in the Y direction, the main CPU 65 transmits a signal to the joining table 29 to correct the position of the joining table 29 in the Y direction.

((Step S5))

The joining unit 23 moves along the rail 5 toward the joining table 29. The adhesive film 5 separated from the base film 3 is set at the joining start position on the semiconductor substrate 27 placed on the joining table 29.

((Step S6))

The joining roller 59 moves downward by means of the air cylinder 61 to press the separated front end of the adhesive film 5. Further, by the movement of the joining unit 23, each of the unreeling roller 45, the pulling roller 51 and the reeling shaft 39 rotates. Thus, the adhesive film 5 is joined to a surface of the semiconductor substrate 27.

Then, when the adhesive film 5 is joined to the semiconductor substrate 27, the feed of the film supply tape 6 is restarted (step S1).

In the adhesive film joining apparatus 21 configured as described above, the illuminator 7 emits light obliquely to an end of an adhesive film 5, and the CCD camera 11, which is disposed above the adhesive film 5 in the direction perpendicular to the adhesive film 5, captures an image of the light reflected irregularly from the end of the adhesive film 5. Herein, since the black plate 13 is disposed on a back side of the adhesive film 5, only the end of the adhesive film 5 is displayed whitely on the monitor 69 by virtue of the reflected light. Based on a line corresponding to the end of the adhesive film 5, a position of the adhesive film 5 is set. Use of the light reflected from the end of the adhesive film 5 brings about the following advantage. That is, the position of the adhesive film 5 can be set accurately irrespective of a color of the adhesive film 5, a color of the base film 3 and a depth of each color.

Moreover, the adhesive film position detector 1 can detect the end of the adhesive film 5 without coming into contact with the adhesive film 5 and the base film 3. Therefore, there is no possibility that the adhesive film 5 is damaged or contaminated. Accordingly, a clean adhesive film 5 can be joined to a semiconductor substrate 27 constantly.

Further, the adhesive film position detector 1 can detect the end of the adhesive film 5 accurately. Therefore, a measurement error upon measuring of the position of the adhesive film 5 falls within a range of ±500 μm. In the adhesive film joining apparatus 21 described above, immediately after the correction of the positional deviation at the rear end of the adhesive film 5, the adhesive film 5 is joined to the semiconductor substrate 27 from its front end side, leading to considerable reduction in joining error of the adhesive film 5 to the semiconductor substrate 27.

It should be understood that the present invention is not limited to the foregoing embodiment. Alternatively, the present invention may be embodied variously as follows.

(1) In the foregoing embodiment, the adhesive film position detector 1 detects only the positional deviation ΔY of the adhesive film 5 in the longitudinal direction of the base film 3. Alternatively, the adhesive film joining apparatus 21 may be configured as follows.

For example, the adhesive film joining apparatus 21 also includes another adhesive film position detector in order to detect a positional deviation ΔX of the adhesive film 5 in a width direction of the base film 3.

(2) In the foregoing embodiment, the adhesive film position detector 1 detects the positional deviation ΔY of the adhesive film 5, and the position of the adhesive film 5 is corrected on the joining table 29. Alternatively, such a position may be corrected on the aligner.

(3) In the foregoing embodiment, the adhesive film position detector 1 detects no positional deviation about a center axis of the semiconductor substrate. Alternatively, another CCD camera may capture an image of an orientation flat or a notch in order to detect a positional deviation of the adhesive film about a center axis. Then, such a positional deviation may be corrected on the aligner.

(4) In the foregoing embodiment, the adhesive film position detector 1 detects a rear end of the adhesive film 5 in view of the arrangement of the constituent components of the adhesive film joining apparatus 21. If a space for arrangement of the adhesive film position detector 1 can be secured, the adhesive film position detector 1 may be arranged so as to detect a front end of the adhesive film 5.

(5) In the foregoing embodiment, the adhesive film position detector 1 detects a positional deviation for each adhesive film 5. Alternatively, the position of only the first adhesive film 5 may be set. With regard to the second and subsequent adhesive films 5, the main CPU 65 may control a feed amount of the film supply tape 6 such that the unreeling roller 45 unreels the film supply tape 6 by an amount corresponding to an interval between the adhesive films 5.

The present invention may be embodied in other specific forms without departing from the sprit or essential attributes thereof and, accordingly, reference should be made to the appended claims, rather than to the foregoing specification, as indicating the scope of the invention.

What is claimed is:

1. An adhesive film position detector comprising:
   illumination means for emitting light obliquely to an end of an adhesive film formed into a predetermined shape and joined to a base film in a longitudinal direction at regular intervals;

a black plate provided on an undersurface of the base film irradiated with the light from the illumination means;

light adjusting means for adjusting intensity of the light from the illumination means;

illumination angle adjusting means for adjusting an illumination angle of the light from the illumination means; and imaging means provided above the adhesive film in a direction perpendicular to the adhesive film, wherein the imaging means receives the light, which is emitted from the illumination means and then is reflected irregularly at the end of the adhesive film, to detect a position of the adhesive film.

2. The adhesive film position detector according to claim 1, wherein the imaging means is a CCD camera.

3. The adhesive film position detector according to claim 1, wherein the illumination means emits red light, blue light and green light with different peak wavelengths.

4. The adhesive film position detector according to claim 3, wherein the illumination means is one of a three-wavelength fluorescent lamp and an aggregate of a single-wavelength LED for red light, a single-wavelength LED for blue light and a single-wavelength LED for green light.

5. The adhesive film position detector according to claim 1, wherein the adhesive film and the base film is of a transparent type.

6. The adhesive film position detector according to claim 5, wherein the adhesive film and the base film is of a colorless type.

7. The adhesive film position detector according to claim 1, wherein the plate has a mat surface.

8. An adhesive film joining apparatus comprising:

the adhesive film position detector according to claim 1;

tape feed means for feeding a film supply tape configured with the base film and the adhesive film joined to the base film in the longitudinal direction at regular intervals;

film separation means for folding and guiding the film supply tape to separate the adhesive film from the base film at a folding end;

a joining roller disposed at a position near the folding end so as to move vertically;

a joining table on which the adhesive film is joined to a substrate placed thereon; and control means for stopping the feed of the film supply tape, based on an adhesive film position signal outputted from the adhesive film position detector, measuring a positional deviation of the adhesive film at the stop position, and correcting a position of the joining table.

9. The adhesive film joining apparatus according to claim 8, wherein the adhesive film position detector detects at least a rear end of the adhesive film in an adhesive film feeding direction, and the control means corrects the position of the joining table, based on a difference between predetermined reference position information and a result of the actually measured rear end.

10. The adhesive film joining apparatus according to claim 9, wherein the substrate is a semiconductor substrate, the adhesive film joining apparatus further comprising detection means for detecting a position of an orientation flat or a notch of the semiconductor substrate, wherein the control means corrects a positional deviation about a center axis of the semiconductor substrate, based on a detection result by the detection means.

* * * * *